Figure 1:
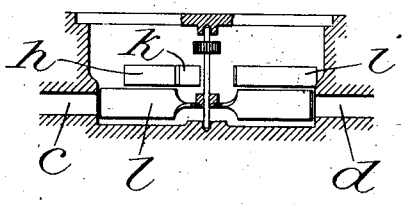

No. 769,351. PATENTED SEPT. 6, 1904.
R. LOHSE.
LIQUID METER.
APPLICATION FILED JULY 1, 1903.
NO MODEL.

Witnesses
T. P. Britt
E. C. Duffy

Inventor
Richard Lohse
By O. E. Duffy & Son
Attys.

No. 769,351. Patented September 6, 1904.

UNITED STATES PATENT OFFICE.

RICHARD LOHSE, OF BRESLAU, GERMANY.

LIQUID-METER.

SPECIFICATION forming part of Letters Patent No. 769,351, dated September 6, 1904.

Application filed July 1, 1903. Serial No. 163,972. (No model.)

*To all whom it may concern:*

Be it known that I, RICHARD LOHSE, engineer, a subject of the Emperor of Germany, residing at Breslau, 33 Brandenburgerstrasse, Germany, have invented new and useful Improvements in Liquid-Meters, of which the following is a specification.

My invention relates to liquid-meters of the class employed for measuring the velocity of flow; and it consists in the arrangement of inlet and outlet passages and the employment of a stationary non-adjustable damming device occupying a definite position relatively to the said passages. The latter, as is the case with prior water-meters, branch off at diametrically opposite places in non-radial directions. The difference between this meter and already-known apparatus, however, is that these passages branch in directions inclined toward different sides of the diameter, so that the water flowing off exercises a damming action on a paddle-wheel. By this arrangement of the inlet and outlet passages the measuring-chamber is divided into a primary and a secondary measuring zone. These two zones are of equal size, but differ in their action in respect to the measurement. In the primary zone the moving water acts directly upon the measuring-wheel, while in the secondary zone only that water drives the measuring-wheel which has not immediately left the measuring-chamber in the direct path from the place of inlet to that of outlet. The actions of the water on the measuring-wheel in the primary and in the secondary measuring zones, respectively, stand for each velocity of flow of the water in a definite proportion to each other.

In order that the meter may act uniformly whatever the load, it is necessary that the intensity of the primary and the secondary action on the measuring-wheel increases in the same proportion from the minimum upward as the power of the water increases corresponding to the rise of load. As is well-known, however, the measuring-wheel invariably rotates in advance at high loads, while it lags at low loads. To overcome this inconvenience as far as possible, a damming device constructed in three parts is employed, the general purpose of which is to diminish the speed of rotation, whereby the error in the measurement is reduced in the direction of zero. This is only perfectly possible in practice by appropriate and symmetrical distribution of the elements of the damming device in the measuring-chamber corresponding to the intensity of the two kinds of action in the latter—that is to say, the primary action in the primary zone and the secondary action in the secondary one. In my new water-meter, therefore, there is one element introduced into the secondary measuring zone exactly symmetrically between the inlet and outlet passages, and into the primary zone, corresponding to the greater intensity of the action, two elements are introduced symmetrically to the inlet and outlet passages. Thus by the application of a damming or check device arranged in this manner not only is the speed of rotation of the liquid in the measuring-chamber reduced, but for the various loads on the meter the action of the liquid on the measuring-wheel will be uniform, for it is obvious that in the case of high velocities of flow of the liquid the damming action of the check device (or parts of the same) in the two measuring zones is intenser than in the case of small velocities, when the damming action altogether ceases, so that for all practical purposes it may be said that the damming device diminishes the speed of the wheel in the case of high velocities and favors more rapid rotation in the case of low velocities. This is an extremely important improvement in principle over prior apparatus of this kind, since after being once carefully adjusted for maximum and minimum measurement my meter requires no further regulation, whereas in the case of similar apparatus as hitherto constructed additional adjustment of exceedingly troublesome character and usually only partly satisfactory is necessary.

My invention is illustrated by the accompanying drawings, in which—

Figure 2:
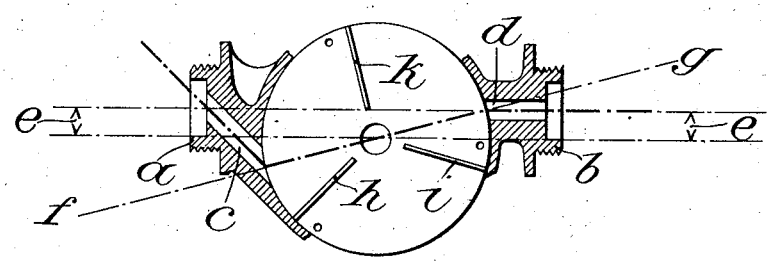

Figure 1 shows a vertical section, and Fig. 2 a sectional plan, of the apparatus, the paddle-wheel being removed.

*a* and *b* are respectively the inlet and outlet screw connections, in which the inlet-passage *c* lies tangentially to the measuring-chamber, while the outlet-passage $d$ is bored axially to the liquid-pipe in such manner that the two passages are inclined toward different sides of the diameter. The axis of the liquid-pipe lies removed from the center of the measuring-chamber by the amount $e$. In this way it is possible to so arrange the outlet-passage $d$ that the connecting-line $f\,g$ between the inlet and outlet passages divides the measuring-chamber into two equal parts and, furthermore, to prevent backward action of the outflowing water on the measuring-chamber and to locate the outlet-passage in the direction of flow of the liquid in the pipe.

The damming device is composed of the elements $h\,i\,k$ and is located above the measuring-wheel $l$. It is so disposed in the measuring-chamber that the elements $h$ and $i$ lie symmetrically in the primary measuring zone and the element $k$ likewise symmetrically in the secondary measuring zone. As is well known, the action of that quantity of liquid which coming from $c$ passes to $d$ directly without any deviation exercises an essentially higher and more impulsive action on the measuring-wheel than the action of the liquid which passes the outlet-passage $d$. It is therefore necessary for the purpose of equalizing the two actions on the measuring-wheel in order to attain constant proportion between the number of rotations of the wheel and of the liquid causing the same to dispose the elements of the damming device in the correct proportion to the two zones. This is the essential condition for uniform registration of the liquid on the part of the meter.

The essential difference between the primary and secondary zones is that in the former only the quantity of liquid which flows directly from the inlet $c$ to the outlet $d$ and at once leaves the latter transfers its energy to the wheel $l$, while the quantity first flowing past the outlet $d$ inside the secondary zone exercises a secondary action on the wheel $l$ before it finally leaves the chamber.

Having thus described my invention, what I claim as new, and desire to secure by Letters Patent, is—

1. In a liquid-meter having a paddle-wheel, peripheral inlet and outlet passages located at diametrically opposite parts of the wheel-box, and branching off toward different sides of the diameter, and three symmetrically-arranged ribs, two of which are located in the semicircular measuring-space first passed through by the water, while the third is located in the second semicircular space located in the same plane as the first and divided from it by the line connecting the inlet and outlet passages of the chamber, all substantially as described.

2. In a liquid-meter having a paddle-wheel, peripheral inlet and outlet passages located at diametrically opposite parts of the wheel-box and branching off toward different parts of the diameter, and three ribs arranged above the measuring-wheel, two of which are located in the semicircular measuring-space first passed through by the water, while the third is located in the second semicircular space located in the same plane, as the first and divided from it by the line connecting the inlet and outlet passages of the chamber all substantially as described.

In witness whereof I have hereunto signed my name, this 9th day of June, 1903, in the presence of two subscribing witnesses.

RICHARD LOHSE.

Witnesses:
    CARL SCHREIBER,
    EUGEN WEIMAN.